US011854248B2

(12) United States Patent
Wu et al.

(10) Patent No.: US 11,854,248 B2
(45) Date of Patent: Dec. 26, 2023

(54) IMAGE CLASSIFICATION METHOD, APPARATUS AND TRAINING METHOD, APPARATUS THEREOF, DEVICE AND MEDIUM

(71) Applicant: BOE TECHNOLOGY GROUP CO., LTD., Beijing (CN)

(72) Inventors: Yanhong Wu, Beijing (CN); Guannan Chen, Beijing (CN); Lijie Zhang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 290 days.

(21) Appl. No.: 17/417,127

(22) PCT Filed: Dec. 29, 2020

(86) PCT No.: PCT/CN2020/140711
§ 371 (c)(1),
(2) Date: Jun. 22, 2021

(87) PCT Pub. No.: WO2021/184902
PCT Pub. Date: Sep. 23, 2021

(65) Prior Publication Data
US 2022/0165053 A1 May 26, 2022

(30) Foreign Application Priority Data
Mar. 19, 2020 (CN) .......................... 202010194826.1

(51) Int. Cl.
*G06V 10/82* (2022.01)
*G06V 10/77* (2022.01)
(Continued)

(52) U.S. Cl.
CPC ............. *G06V 10/82* (2022.01); *G06N 3/045* (2023.01); *G06V 10/764* (2022.01);
(Continued)

(58) Field of Classification Search
CPC .. G06V 10/82; G06V 10/764; G06V 10/7715; G06V 10/774; G06V 10/776;
(Continued)

(56) References Cited

U.S. PATENT DOCUMENTS 10,891,723 B1 * 1/2021 Chung .................... G06T 5/40
11,010,600 B2 5/2021 Qing et al.
(Continued)

FOREIGN PATENT DOCUMENTS

CN 108764317 A 11/2018
CN 109348211 A * 2/2019 ........... G06N 3/0454
(Continued)

OTHER PUBLICATIONS

O. Arriaga et al., "Real-Time Convolutional Neural Networks for Emotion and Gender Classification," arXiv:1710.07557 [cs.CV], Oct. 20, 2017.
(Continued)

*Primary Examiner* — Juan A Torres
(74) *Attorney, Agent, or Firm* — Chiwin Law LLC

(57) ABSTRACT

The present disclosure provides an image classification method, apparatus, and device, and a readable storage medium. The image classification method includes: processing an image to be processed, by using a first convolutional network, to obtain a first feature map; processing the first feature map, by using a residual network, to obtain a second feature map, wherein the residual network includes a depth separable convolutional layer; and processing the second feature map, by using a second convolutional network, to determine a category label of the image to be processed.

14 Claims, 11 Drawing Sheets

(51) Int. Cl.
  *G06V 10/774* (2022.01)
  *G06V 10/776* (2022.01)
  *G06V 10/764* (2022.01)
  *G06N 3/045* (2023.01)
(52) U.S. Cl.
  CPC .......... *G06V 10/774* (2022.01); *G06V 10/776* (2022.01); *G06V 10/7715* (2022.01)
(58) Field of Classification Search
  CPC .. G06V 10/454; G06V 40/172; G06V 40/174; G06N 3/045; G06F 18/214; G06F 18/2415
  USPC .......................................................... 382/157
  See application file for complete search history.

(56) References Cited

U.S. PATENT DOCUMENTS

| | | | |
|---|---|---|---|
| 11,024,037 B2* | 6/2021 | Du | G06V 30/1916 |
| 11,410,000 B2* | 8/2022 | Hu | G06V 10/82 |
| 11,416,781 B2* | 8/2022 | Chen | G06V 10/764 |
| 11,636,328 B2* | 4/2023 | Ranjan | G06V 10/82 706/15 |
| 2019/0325203 A1* | 10/2019 | Yao | G06V 10/454 |
| 2021/0279971 A1* | 9/2021 | Wang | G06N 3/045 |
| 2022/0148328 A1* | 5/2022 | Ye | G06V 20/52 |

FOREIGN PATENT DOCUMENTS

| | | | | |
|---|---|---|---|---|
| CN | 109815785 A | 5/2019 | | |
| CN | 109871830 A | 6/2019 | | |
| CN | 109886190 A | 6/2019 | | |
| CN | 109740534 A | 10/2019 | | |
| CN | 110334715 A | 10/2019 | | |
| CN | 111368937 A | 3/2020 | | |
| KR | 20200052402 A | * | 5/2020 | G06T 3/4046 |
| KR | 20200057618 A | * | 5/2020 | G06T 7/194 |
| WO | 2019119396 A1 | 6/2019 | | |

OTHER PUBLICATIONS

S. Li et al., "Reliable Crowdsourcing and Deep Locality-Preserving Learning for Expression Recognition in the Wild" 2017 IEEE Conference on Computer Vision and Pattern Recognition (CVPR). IEEE, 2017.

* cited by examiner (a) depthwise convolution (b) pointwise convolution

IMAGE CLASSIFICATION METHOD, APPARATUS AND TRAINING METHOD, APPARATUS THEREOF, DEVICE AND MEDIUM

CROSS REFERENCE TO RELATED APPLICATION

This application is a U.S. National Phase Entry of International Application No. PCT/CN2020/140711 filed on Dec. 29, 2020, designating the United States of America and claiming priority to Chinese Patent Application No. 202010194826.1, filed on Mar. 19, 2020. The present application claims priority to and the benefit of the above-identified applications and the above-identified applications are incorporated by reference herein in their entirety.

TECHNICAL FIELD

The present disclosure relates to a technical field of image processing, and in particular to an image classification method, apparatus, device and readable storage medium.

BACKGROUND

Based on artificial intelligence technology, a recognition of image categories can be realized, that is, image classification can be realized. For example, the facial expression categories of human faces in image can be identified for applications such as security, finance, entertainment, and daily life. However, it is difficult to make a substantial breakthrough in the accuracy of image classification by machine learning. For the existing neural networks used for image classification, in order to ensure the accuracy of classification, the neural networks generally have a relatively complex network structure and a large amount of parameter calculation, which is not conducive to apply on terminal devices such as mobile phones and cannot meet a requirement of real-time processing.

SUMMARY

According to an aspect of the present disclosure, an image classification method is provided and comprises: processing an image to be processed, by using a first convolutional network, to obtain a first feature map; processing the first feature map, by using a residual network, to obtain a second feature map, the residual network comprises a depth separable convolutional layer; and processing the second feature map, by using a second convolutional network, to determine a category label of the image to be processed.

According to some embodiments of the present disclosure, the residual network comprises at least one residual module that is connected in series, each of the at least one residual module comprises a first processing path and a second processing path, the first processing path comprises the depth separable convolutional layer, and the second processing path comprises a convolutional layer and a batch normalization layer.

According to some embodiments of the present disclosure, in a case that the residual network comprises N residual modules that are connected in series and N is a positive integer greater than 1, processing the first feature map by using the residual network comprising: processing the first feature map that is received by using a first processing path and a second processing path in the first residual module of the residual network separately, to obtain a first residual feature map; and processing an i−1-th residual feature map that is received, by using a first processing path and a second processing path in an i-th residual module of the residual network separately, to obtain an i-th residual feature map, and i is a positive integer greater than 1 and less than or equal to N.

According to some embodiments of the present disclosure, the first convolutional network comprises a convolutional layer, a batch normalization layer, and a nonlinear processing layer, and the second convolutional network comprises a convolutional layer and a global average pooling layer.

According to another aspect of the present disclosure, a training method for an image classification model is also provided and comprises: obtaining a training sample; processing the training sample, by using a first convolutional network, to obtain a first training feature map; processing the first training feature map, by using a residual network, to obtain a second training feature map; calculating a local loss value based on the second training feature map according to a local loss retention function; and training the first convolutional network, the residual network and a second convolutional network based on the local loss value by using an optimizer, the local loss retention function represents a feature distance between the training sample and at least one sample of a same category.

According to some embodiments of the present disclosure, the training method further comprises: processing the second training feature map, by using the second convolutional network, to determine a category label of the training sample; calculating a network loss value based on the category label and a real label of the training sample according to a cross entropy loss function; and training the first convolutional network, the residual network and the second convolutional network based on the network loss value by using an optimizer.

According to another aspect of the present disclosure, an image classification apparatus is also provided and comprises: a first convolutional network unit that is configured for processing an image to be processed, by using a first convolutional network, to obtain a first feature map; a residual network unit that is configured for processing the first feature map, by using the residual network, to obtain a second feature map, the residual network comprises a depth separable convolutional layer; and a second convolutional network unit that is configured for processing the second feature map, by using the second convolutional network, to determine a category label of the image to be processed.

According to some embodiments of the present disclosure, the residual network comprises at least one residual module that is connected in series, each of the at least one residual module comprises a first processing path and a second processing path, the first processing path comprises a depth separable convolutional layer, and the second processing path comprises a convolutional layer and a batch normalization layer.

According to some embodiments of the present disclosure, in a case that the residual network comprises N residual modules that are connected in series and N is a positive integer greater than 1, processing the first feature map by using the residual network comprising: processing the first feature map that is received by using a first processing path and a second processing path in a first residual module of the residual network separately, to obtain a first residual feature map; processing an i−1-th residual feature map that is received by using a first processing path and a second processing path in an i-th residual module of the residual network separately, to obtain an i-th residual feature map, where i is a positive integer greater than 1 and less than or equal to N.

According to some embodiments of the present disclosure, the first convolutional network comprises a convolutional layer, a batch normalization layer, and a nonlinear processing layer, and the second convolutional network comprises a convolutional layer and a global average pooling layer.

According to another aspect of the present disclosure, a training apparatus for an image classification model is also provided, which is configured to: obtain a training sample; process the training sample, by using a first convolutional network, to obtain a first training feature map; process the first training feature map, by using a residual network, to obtain a second training feature map; calculate a local loss value based on the second training feature map according to a local loss retention function; and train the first convolutional network, the residual network and a second convolutional network based on the local loss value by using an optimizer, the local loss retention function represents a feature distance between the training sample and at least one sample of a same category.

According to some embodiments of the present disclosure, the training apparatus is further configured to: process the second training feature map, by using the second convolutional network, to determine a category label of the training sample; calculate a network loss value based on the category label and a real label of the training sample according to a cross entropy loss function; and train the first convolutional network, the residual network and the second convolutional network based on the network loss value by using an optimizer.

According to yet another aspect of the present disclosure, an image processing device is also provided and comprises: a processor; a memory, the memory stores computer-readable codes, which when run by the processor, execute the image classification method as described above or the training method of the image classification model as described above.

According to yet another aspect of the present disclosure, a computer-readable storage medium having instructions stored thereon is also provided, the instructions when executed by a processor, cause the processor to execute the image classification method as described above or the training method for the image classification model as described above.

BRIEF DESCRIPTION OF THE DRAWINGS

In order to illustrate the embodiments of the present disclosure or the technical solutions in the prior art more clearly, the following will briefly introduce the drawings that need to be used in the description of the embodiments or the prior art. Obviously, the drawings in the following description are merely some embodiments of the present disclosure, for those of ordinary skill in the art, other drawings can be obtained from these drawings without paying creative labor.

DETAILED DESCRIPTION

Figure 1:
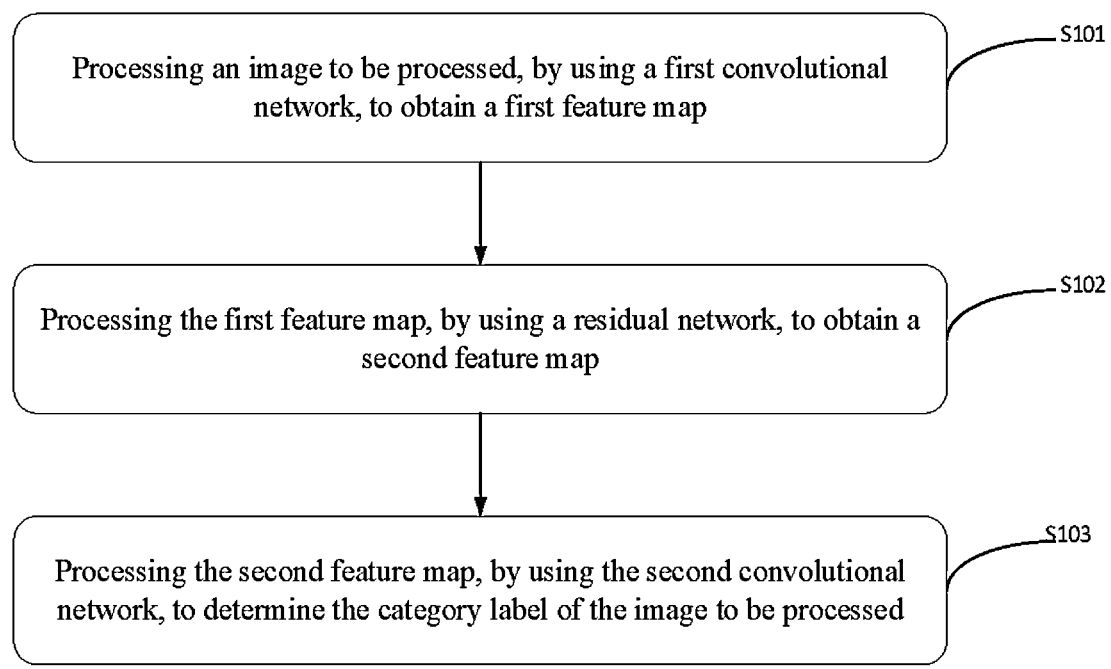
FIG. 1 shows a flow diagram of an image classification method according to an embodiment of the present disclosure.

The technical schemes in the embodiments of the present disclosure will be described clearly and completely in combination with the drawings in the embodiments of the present disclosure. Obviously, the described embodiments are only part of the embodiments of the present disclosure, not all of them. Based on the embodiments in the present disclosure, all other embodiments obtained by those of ordinary skill in the art without making creative work shall fall within the protection scope of the present disclosure.

The words "first", "second" and similar words used in the present disclosure do not mean any order, quantity, or importance, but are only used to distinguish different components. Similarly, similar words such as "including" or "comprising" mean that the elements or items appearing before the word cover the elements or items listed after the word and their equivalents, but do not exclude other elements or items. Similar words such as "connecting" or "connected" are not limited to physical or mechanical connections, but can comprise electrical connections, whether direct or indirect.

A flowchart is used in the present disclosure to illustrate steps of a method according to an embodiment of the present disclosure. It should be understood that the preceding or following steps are not necessarily processed exactly in order. Instead, various steps can be processed in reverse order or simultaneously. At the same time, other operations can also be added to these processes.

Artificial intelligence (AI) is a theory, method, technology, and application system that uses a digital computer or digital computer-controlled machine to simulate, extend and expand human intelligence, perceive environment, acquire knowledge, and use knowledge to obtain the best results. In other words, artificial intelligence is a comprehensive technology of computer science, and artificial intelligence attempts to understand the essence of intelligence and produce a new intelligent machine that can respond in a similar way of human intelligence. Artificial intelligence is to study the design principles and implementation methods of various intelligent machines, and to make the machines have the functions of perception, reasoning, and decision-making.

Artificial intelligence technology is a comprehensive subject, involving a wide range of fields, including hardware level technology and software level technology. AI software technology mainly includes computer vision technology, speech processing technology, natural language processing technology and machine learning/depth learning, etc., For example, image classification and other processing can be implemented by training a neural network based on training samples, to identify image categories.

As described above, the existing network structure for image classification is relatively complex, and has a large amount of parameter calculation, so that the existing network structure is not suitable for terminal device, and cannot meet the needs of real-time processing.

In order to solve the above problems, the present disclosure provides an image classification method, the adopted classification neural network (or classification network for short) has a simple structure, a small amount of parameter calculation, and is more convenient to be applied to the terminal device on the basis of ensuring the accuracy of classification, and increases the image processing rate to realize real-time processing.

Figure 2:
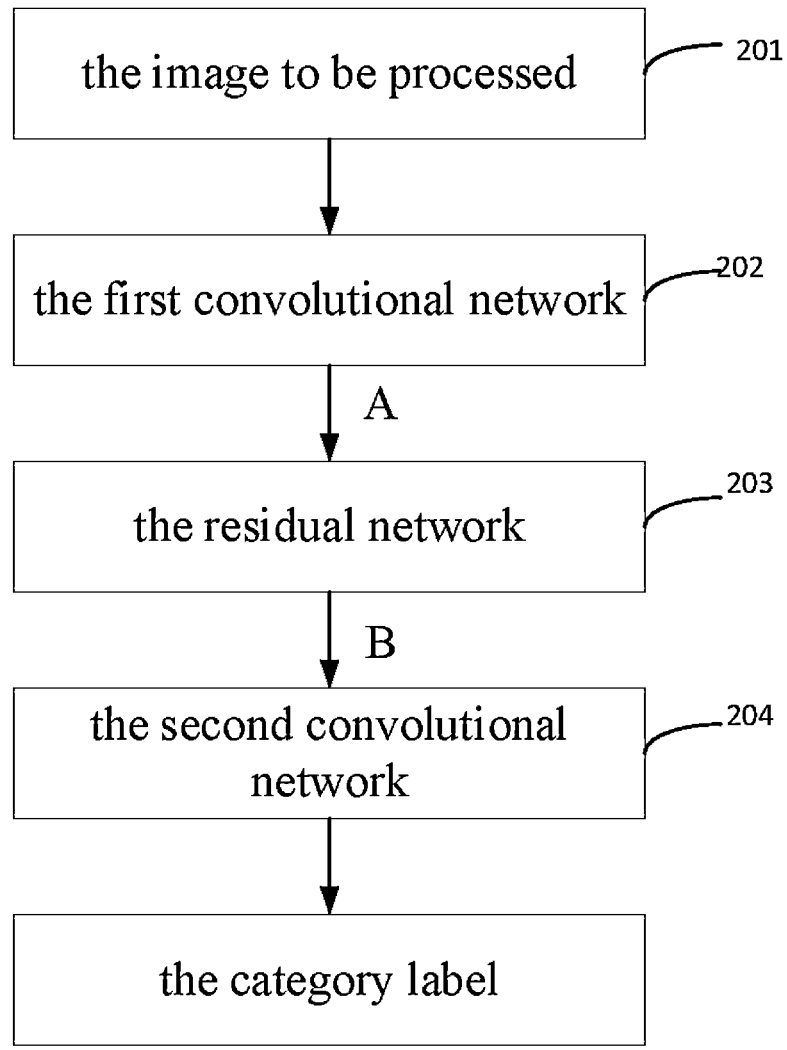
FIG. 2 shows a schematic structure diagram of a classification neural network according to an embodiment of the present disclosure.

FIG. 1 shows a flow diagram of the image classification method according to an embodiment of the present disclosure, and FIG. 2 shows a schematic structure diagram of the classification neural network according to an embodiment of the present disclosure. The image classification method provided according to the present disclosure and the adopted network structure of the classification network will be described in detail in combination with FIG. 1 and FIG. 2.

As shown in FIG. 1, first, in step S101, processing an image to be processed, by using a first convolutional network, to obtain a first feature map.

As an application example, the image to be processed 201 may be an image including a human face, and the image classification method is used to identify facial expression to classify facial expression in the image 201, for example, facial expressions may be classified into categories such as joy, surprise, calm, sadness, anger, disgust, fear, etc. The following will describe the method according to the present disclosure by taking the classification of facial expressions as a specific example, it should be noted that the method provided according to the present disclosure can be used for other image classification processing, which is not limited here.

A first convolutional network 202 can receive the image to be processed 201 to for image processing. The first convolutional network 202 may include, for example, at least one convolutional layer. As shown in FIG. 2, the first feature map A represents a processing result obtained by processing the image to be processed 201 by the first convolutional network 202 and is transmitted to the residual network 203.

Next, in step S102, processing the first feature map, by using the residual network, to obtain a second feature map. As shown in FIG. 2, the first feature map B represents a processing result obtained by processing the first feature map A output by the first convolutional network 202 by the residual network 203. According to an embodiment of the present disclosure, the residual network 203 includes a depth separable convolutional layer, and the network structure and processing flow of the depth separable convolutional layer will be described in detail hereinafter.

Next, in step S103, processing the second feature map, by using the second convolutional network, to determine the category label of the image to be processed, the category label indicates the category to which the image to be processed belongs. Specifically, as shown in FIG. 2, the second convolutional network 204 processes the second feature map B and obtains a category label of the image to be processed 201. For example, the second convolutional network 204 can obtain a probability distribution corresponding to the facial expression category and determine the category with the highest probability value in the probability distribution as the category label of the image to be processed. As an example, when the facial expressions to be identified include seven categories: joy, surprise, calm, sadness, anger, disgust and fear, the probability distribution may be [0.2, 0.2, 0.1, 0.3, 0.2, 0.1, 0.7], thus the fear category with the highest probability value (i.e., 0.7) may be determined as the category label of the image to be processed, representing that the facial expression in the image to be processed is fear.

In the image classification method according to the present disclosure, the design concept of the residual network and the depth separable convolutional processing are combined to balance the network processing performance and the model size. On the premise of ensuring the accuracy of image classification, the size of the network model is simplified, so that the model can realize real-time image classification processing on the terminal, for example, for facial expression recognition.

Figure 3:
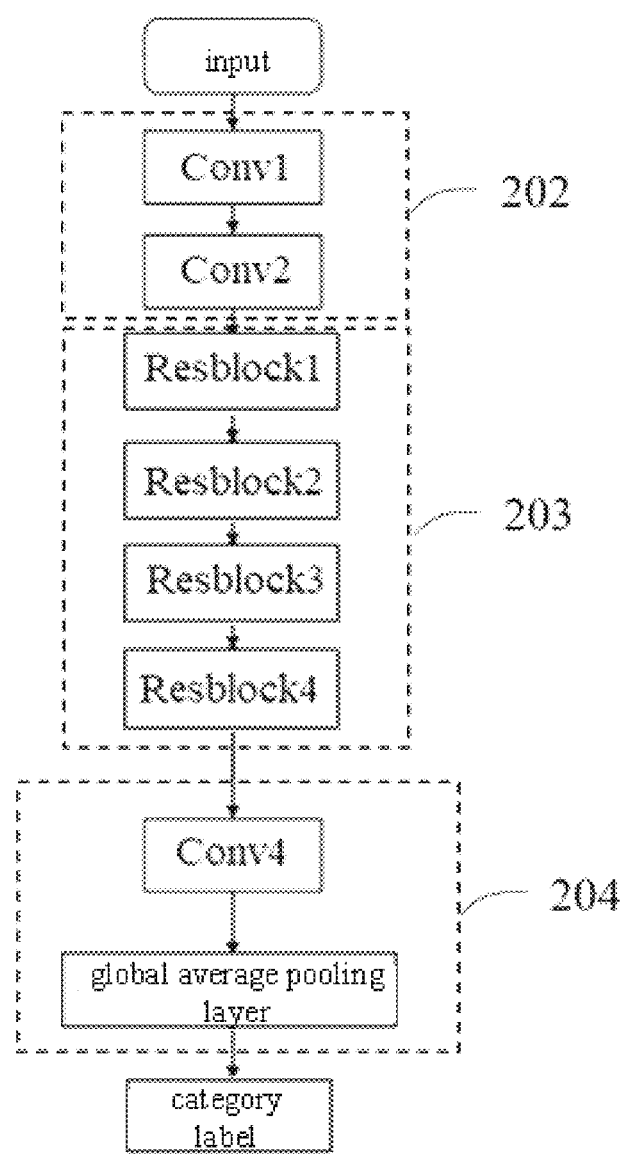
FIG. 3 shows a network structure diagram of a classification neural network according to an embodiment of the present disclosure.

FIG. 3 shows a network structure diagram of a classification neural network according to an embodiment of the present disclosure. The specific structure of the classification neural network applied by the method according to the present disclosure will be described in detail below with reference to FIG. 3.

According to an embodiment of the present disclosure, the first convolutional network comprises a convolutional layer, a batch normalization layer, and a nonlinear processing layer.

As shown in FIG. 3, the first convolutional network 202 comprises a first convolutional sub network Conv1 and a second convolutional sub network Conv2. According to an embodiment of the present disclosure, the first convolutional sub network Conv1 and the second convolutional sub network Conv2 can have the same network structure, for example, each sub network comprises a convolutional layer, a batch normalization layer (BN) and a nonlinear processing layer (ReLU) that are successively connected.

As an example, the input image of the first convolutional network 202 may be a face image with a length of H1, a width of H2 and a channel number of C, for example, the size of the input image may be 7*7*3, that is, the length is 7, the width is 7, and the number of channels is 3.

Figure 4:
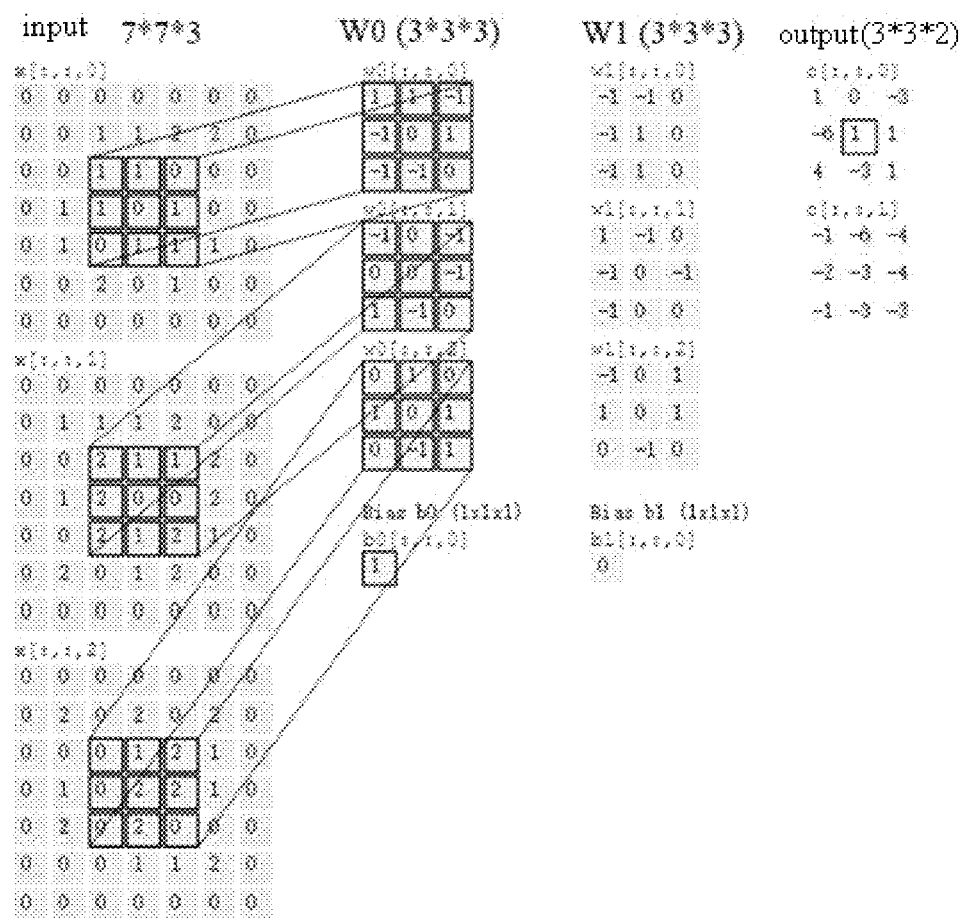
FIG. 4 shows a schematic processing flow diagram of a convolutional layer.

FIG. 4 shows a schematic processing flow chart of the convolutional layer, for example, the convolutional kernel size of the convolutional layer is set to 3*3 and receives the face image with the size of 7*7*3 as described above. As an example, if the number of channels output by the convolutional layer is 2, two convolutional parameters W0 and W1 are used to obtain two feature maps, respectively. During the convolutional process, convolutional parameters perform convolutional operations on the input images of the three channels respectively, the convolutional kernel of each channel corresponds to the box in W0 and W1, the convolutional kernel is multiplied by the value (i.e., pixel value) at corresponding position in the input image, and the product results are added, and then an offset value (b0 or b1) is added to obtain the value in the output feature map.

According to an embodiment of the present disclosure, BN layer is used for normalizing a batch of data in the network to accelerate the convergence speed of the model, and to alleviate the problem of "gradient dispersion" in the depth network to a certain extent, so as to improve the training speed and have fast convergence. After the facial expression is processed by convolution layer, a series of feature images are obtained. Assuming that the minimum batch (min-batch) is M, the input data of a certain layer in the network may be expressed as a four-dimensional matrix (M, F, W, H), where M is min-batch, F is the number of feature maps, and W and H are the length and width of the feature maps, respectively. For example, in the convolutional layer shown in FIG. 4, the number of feature maps is 2, that is, F=2.

In convolutional neural network, each feature map may be regarded as a feature processing unit (i.e., a neuron), and when using the BN layer, the minimum batch size (min-batch size) may be M*W*H. In addition, each feature map have learning parameters: $\gamma$, $\theta$. The BN layer normalizes each neuron, and the processing procedure of the BN layer may be expressed as: calculating an average value and a variance of all neurons in a feature map, and then normalizing the neurons in the feature map. Specifically, the formula for the BN layer is as follows:

$$\mu_i = \frac{1}{m*w*h} \sum_m \sum_{w,h} x_{m,w,h} \quad (1)$$

$$\sigma_i^2 = \frac{1}{m*w*h} \sum_m \sum_{w,h} (x_{m,w,h} - \mu_i)^2 \quad (2)$$

$$\hat{x}_{m,w,h} = \frac{x_{m,w,h} - \mu_i}{\sqrt{\sigma_i^2 + \epsilon}} \quad (3)$$

$$y_{m,w,h} = \gamma_i * \hat{X}_{m,w,h} + \theta_i \quad (4)$$

where $i \in (1, 2, \ldots, F)$ represents the i-th feature map, $x_{m,w,h}$ represents the pixel value of pixel with coordinate position of [w,h] in the m-th batch in mini-batch. $\mu_i$ represents the average value of $x_{m,w,h}$, $\sigma_i^2$ represents the variance of $x_{m,w,h}$, and $\epsilon$ is a small value that is not equal to 0 to keep the denominator from being 0. $y_{m,w,h}$ is an output value corresponding to the $x_{m,w,h}$. $\gamma_i$ and $\theta_i$ represents a pair of learnable hyper parameters of the i-th input feature map.

According to an embodiment of the present disclosure, the ReLU layer comprises a nonlinear function. Convolutional operation is linear operation, and the nonlinear function is used to activate neurons to overcome the problem of gradient disappearance and accelerate the training speed.

According to an embodiment of the present disclosure, the residual network 203 may include at least one residual module that is connected in series, and each residual module in the at least one residual module includes a first processing path and a second processing path, the first processing path includes a depth separable convolutional layer, and the second processing path comprises a convolutional layer and a batch normalization layer. The series connection can mean that the residual modules are connected in sequence.

According to an embodiment of the present disclosure, in a case that the residual network comprises N residual modules that are connected in series, where N is a positive integer greater than 1, processing the first feature map by using the residual network includes: processing the first feature map that is received, by using the first processing path and the second processing path in the first residual module of the residual network separately, to obtain the first residual feature map; processing the i−1-th residual feature map that is received, by using the first processing path and the second processing path in the i-th residual module of the residual network separately, to obtain the i-th residual feature map, and i is a positive integer greater than 1 and less than or equal to N.

Returning to FIG. 3, the residual network includes four residual modules, namely, Resblock1, Resblock2, Resblock3 and Resblock4, and the four residual modules are connected in series, that is, connected in sequence. In the example in FIG. 3, N=4, and it should be noted that the residual network according to the present disclosure may also have other number of residual modules, which is not limited here.

Figure 5:
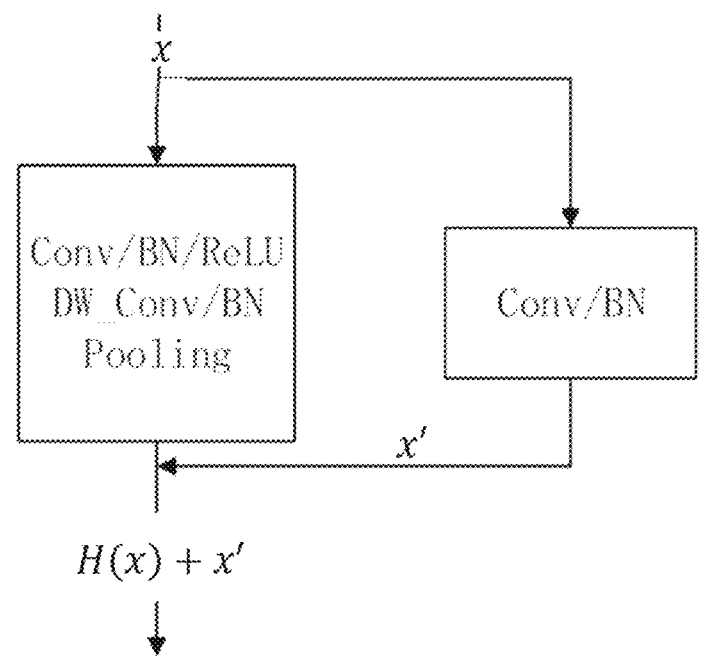
FIG. 5 shows a network structure diagram of a residual module according to an embodiment of the present disclosure.

According to an embodiment of the present disclosure, each residual module may have the same network structure. FIG. 5 shows a network structure diagram of a residual module according to an embodiment of the present disclosure. As shown in FIG. 5, the residual module includes a first processing path and a second processing path. The first processing path includes a convolutional layer (Conv), a BN layer, a ReLU layer, a depth separable convolutional layer (DW_Conv), a BN layer and a pooling layer that are sequentially connected. The first processing path processes the input parameter x, and the output obtained may be expressed as H(x), where H(x) represents the intermediate result obtained by processing the input parameter x by the first processing path. The second processing path includes a convolutional layer (Conv) and a BN layer. The second processing path processes the input parameter x, and the output obtained may be expressed as x', where x' represents the intermediate result obtained by processing the input parameter x by the second processing path. The output of the residual module is a sum of the intermediate processing results of the two processing paths, that is, H(x)+x', which is the first residual feature map. In addition, the processing flow of the above convolutional layer (Conv), BN layer and ReLU layer is the same as that described above with respect to the first convolutional network 202, and the description will not be repeated here.

Specifically, as shown in FIG. 5, in the first processing path of the residual module, the convolutional operation does not change the size of the input feature map but increases the number of output channels to twice the number of input channels, and reduces the size of the feature map to ½ of the original size by using the pooling layer. In the second processing path of the residual module, the convolutional layer with step size of 2 is used to reduce the dimension of the input feature map, so that the number of channels of the feature map becomes twice the number of channels of the input feature map, and the size of the feature map is reduced to ½ of the original size. The output of the residual module is obtained by adding the processing results of the two processing paths.

Figure 6A:
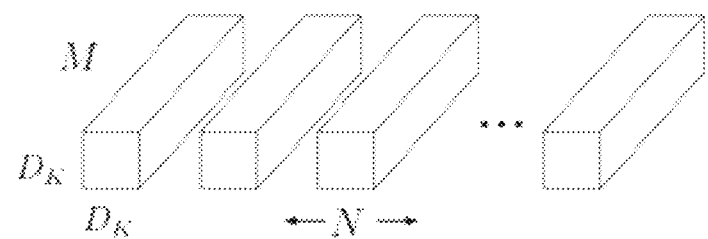
FIG. 6A shows a schematic diagram of parameters of a conventional convolution.

According to an embodiment of the present disclosure, FIG. 6A shows a parameter diagram of a conventional convolution. When performing a conventional convolutional operation, each output feature map corresponds to all input feature map. Assuming that the size of the input feature map is $D_F \times D_F \times N1$, the size of the output feature map is $D_F \times D_F \times N2$ and the size of the convolutional kernel is $D_F \times D_F \times N2$, then the parameter quantity of the conventional convolution is as follows:

$$N1 \times N2 \times P_g \times D_K \quad (5)$$

Figure 6B:
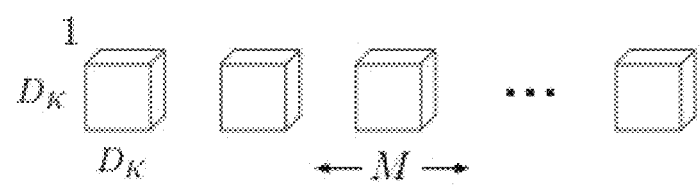
FIG. 6B shows a schematic diagram of parameters of a depth separable convolutional layer.
Figure 6B:
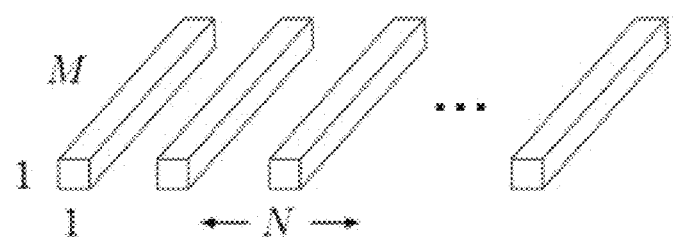

In comparison, FIG. 6B shows a schematic diagram of the parameters of a depth separable convolutional layer according to an embodiment of the present disclosure. As shown in FIG. 6B, the depth separable convolutional layer decomposes the conventional convolution as shown in FIG. 6A into a depthwise convolution and a 1×1 pointwise convolution. In the depth separable convolutional operation, first, each input feature map is convolved once to obtain the intermediate result, and then all intermediate results are combined into a final output by the 1×1 pointwise convolution. The parameter quantity of the depth separable convolutional layer is the sum of the parameter quantity of the depth convolution and that of the 1×1 convolution:

$$N1 \times D_K \times D_K + N1 \times N2 \quad (6)$$

Thus, the ratio of the parameter quantity of the depth separable convolution to that of the conventional convolution may be determined as:

$$\frac{N1 \times D_K \times D_K \times N1 \times N2}{N1 \times N2 \times D_K \times D_K} = \frac{1}{N2} + \frac{1}{D_K^2} \quad (7)$$

Taking the parameters in FIG. 4 as an example, the input is 7*7*3, the output is 3*3*2, and the convolutional kernel size is 3*3, then the ratio of the parameter quantity of the depth separable convolution to that of the conventional convolution is:

$$\frac{3 \times 3 \times 3 \mid 3 \times 2}{3 \times 2 \times 3 \times 3} \approx 0.611 \quad (8)$$

The parameter quantity of the convolution can represent the calculation amount of the network. When the number of output channels N2 is large enough, the calculation amount of the depth separable convolution is close to about 1/9 of that of the conventional convolution.

Figure 7A:
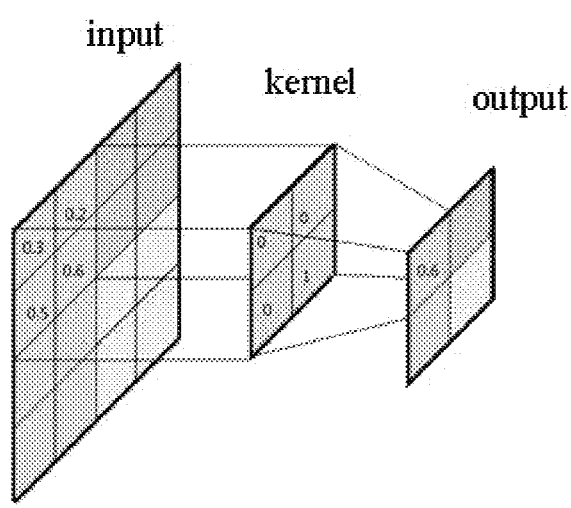
FIG. 7A shows a processing flow diagram of a maximum pooling layer.
Figure 7B:
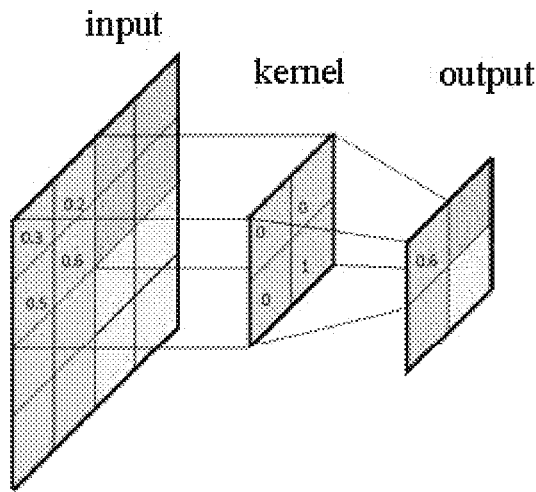
FIG. 7B shows a processing flow diagram of an average pooling layer.

According to an embodiment of the present disclosure, the pooling layer is used to reduce the parameters and is generally placed behind the convolutional layer. Pooling may include maximum pooling and average pooling. FIG. 7A and FIG. 7B show the processing flow charts of the maximum pooling layer and the average pooling layer, respectively. As an example, the pooling layer shown in FIG. 5 may be an average pooling layer.

As shown in FIG. 3, the first residual module Resblock1 in the residual network processes the received first feature map A to obtain the first residual feature map. Then, the second residual module Resblock2 in the residual network processes the received first residual feature map to obtain the second residual feature map, and so on. The fourth residual feature map obtained by the last residual module Resblock4 is taken as the output of the residual network, that is, the second feature map B.

According to an embodiment of the present disclosure, the second convolutional network comprises a convolutional layer and a global average pooling layer.

As shown in FIG. 3, the second convolutional network 204 processes the received second feature map B and obtains the category label of the input face image. According to an embodiment of the present disclosure, the second convolutional network 204 comprises a convolutional layer (Conv4) and a global average pooling layer. The global average pooling layer belongs to a kind of the average pooling layer, and the size of the pooling kernel is equal to the size of the input feature map. After the pooling process, the size of the feature map becomes 1×1.

According to the image classification method of the present disclosure, for example, the classification network model shown in FIG. 3 may be used to realize accurate and fast image classification, for example, to recognize the categories of facial expressions. Using the residual module in the classification network model for image processing simplifies the network model and reduces the complexity of the model. In addition, in the method according to the present disclosure, the residual network comprises a depth separable convolutional layer which can further reduce the amount of parameter calculation. Therefore, the method according to the present disclosure can be used to realize fast image classification processing, and can be applied to terminal devices with limited computing capabilities because of reducing the amount of network parameter calculation.

As an application example, the method according to the present disclosure can be used to classify a variety of expressions of the input human face image. According to the network structure shown in FIG. 3, the face image is processed by a two-layer convolutional sub network, four residual modules, a convolutional layer and a global average pooling layer, to obtain the recognition result of the facial expression. The method has fast execution speed and can achieve real-time expression recognition.

In the image classification method according to the present disclosure, the design concept of the residual network and the depth separable convolutional processing are combined to balance the network processing performance and model size. On the premise of ensuring the accuracy of image classification, the network model size is simplified, so that the model can realize real-time image classification processing on the terminal, for example, for facial expression recognition.

Figure 8A:
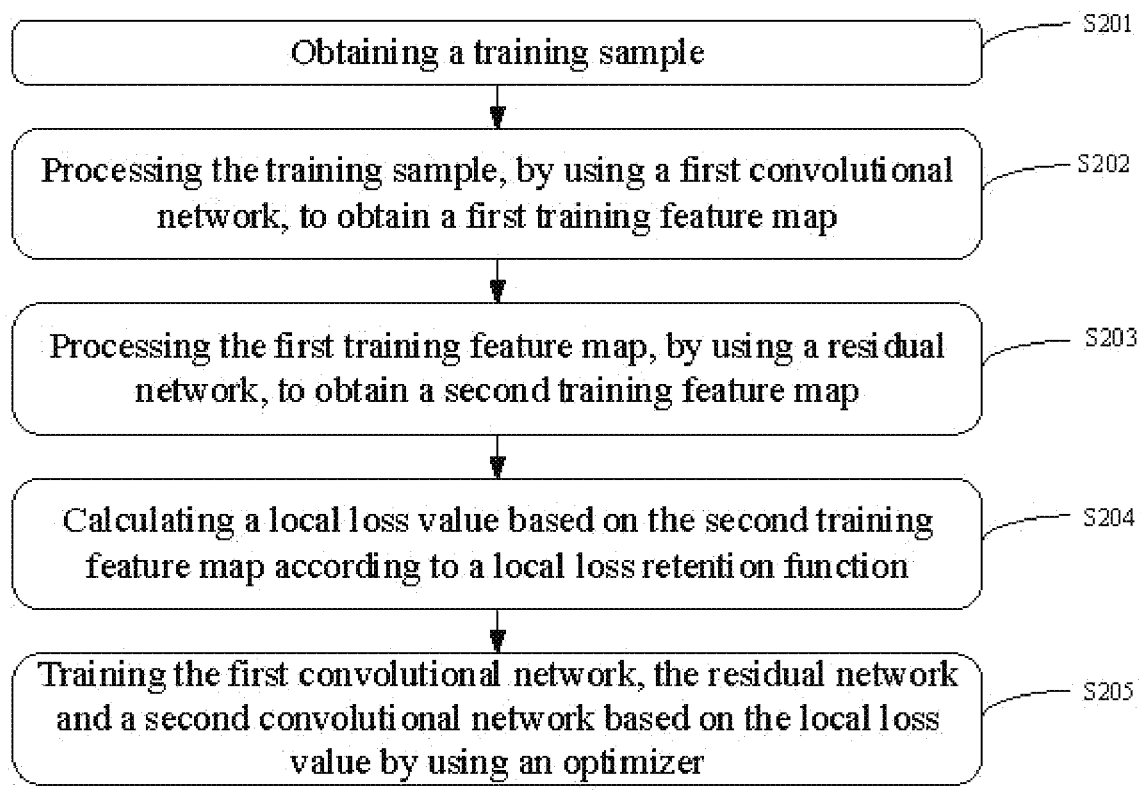
FIG. 8A shows a flow diagram of a training method for an image classification model according to an embodiment of the present disclosure.

Before using the classification network model shown in FIG. 3 for image classification, the network parameters need to be trained. The present disclosure also provides a training method of an image classification model for training a classification network model. FIG. 8A shows a flow diagram of a training method of an image classification model according to an embodiment of the present disclosure, and the following will describe the training method in combination with FIG. 8A.

As shown in FIG. 8A, the training method comprises steps S201-S205. S201: obtaining a training sample; S202: processing the training sample, by using the first convolutional network, to obtain the first training feature map; S203: processing the first training feature map, by using the residual network, to obtain the second training feature map; S204: calculating the local loss value based on the second training feature map according to the local loss retention function; and S205: training the first convolutional network, the residual network and a second convolutional network based on the local loss value by using an optimizer (S205), the local loss retention function represents a feature distance between the training sample and at least one sample of a same category. The first convolutional network, the residual network and the second convolutional network constitute the image classification model, and the image classification model is used to realize the image classification processing according to the image classification method described above. For the specific structure of each network, refer to the description above in combination with FIG. 2-FIG. 7B, which will not be repeated here.

In the process of using the training sample to train the classification network model, the overall loss value of the network will be affected by a single sample. For example, in the processing task of facial expression recognition, the intra-class gap of the same category is relatively large. For example, in the happy expression category, the difference between laughter and smile is large, which will directly affect the overall loss value of the network. According to the method of the present disclosure, a loss function that is locally preserved (that is, a local loss retention function) is proposed to maintain the feature locality between each training sample. In addition, the local loss function represents the feature distance between the training sample and at least one sample of the same category, for example, the feature distances of K similar samples in the same category as the training samples are as close as possible to supervise the learning process of the network. The local loss retention function according to the present disclosure is expressed as:

$$L1 = \frac{1}{2}\sum_{i=1}^{n}\left\|x_i - \frac{1}{K}\sum_{j}^{n}x_j s_{i,j}\right\|_2^2 \quad (9)$$

where $x_i$ represents the sample feature currently undergoing training processing, that is, the second training feature map obtained from the training samples, $S_{i,j}$ represents whether the sample feature $x_j$ belongs to the similar samples of $x_i$ in the same category, and n represents the number of samples in the mini-batch.

According to the local loss retention function as shown in the above formula (9), the local loss value of the network may be calculated, and the first convolutional network, the residual network and the second convolutional network are trained based on the local loss value by using the optimizer. As an example, a small batch random gradient descent method may be used as the optimizer.

According to an embodiment of the present disclosure, the training method of the image classification model further comprises: processing the second training feature map, by using the second convolutional network, to determine the category label of the training sample; calculating the network loss value based on the category label and a real label of the training sample according to a cross entropy loss function; and training the first convolutional network, the residual network and the second convolutional network based on the network loss value by using the optimizer. Compared with the local loss retention function used to calculate the local loss value between sample features, the cross entropy loss function is used to calculate the overall loss value of the classification network.

As an example, the cross entropy loss function may be a softmax function. The softmax function is used to convert an array to a probability distribution, assuming $y_i$ is the i-th element in the array, the output of softmax is expressed as:

$$S_i = \frac{e^{y_i}}{\Sigma_j e^{y_j}} \quad (10)$$

where $\Sigma_j S_j = 1$, using the softmax function to calculate the loss value is expressed as:

$$L2 = -\Sigma_j t_j * \ln S_j \quad (11)$$

where $t_j$ represents the real label of the training sample, and when processing the j-th training sample, $t_j = 1$, $t_{i \neq j} = 0$. Therefore, the loss function may be simplified as:

$$L2 = -\ln S_j \quad (12)$$

According to the loss function shown in the above formula (12), the overall loss value of the network may be calculated, and the optimizer is used to train the first convolutional network, the residual network and the second convolutional network based on the overall loss value. As an example, a small batch random gradient descent method can be used as the optimizer.

Figure 8B:
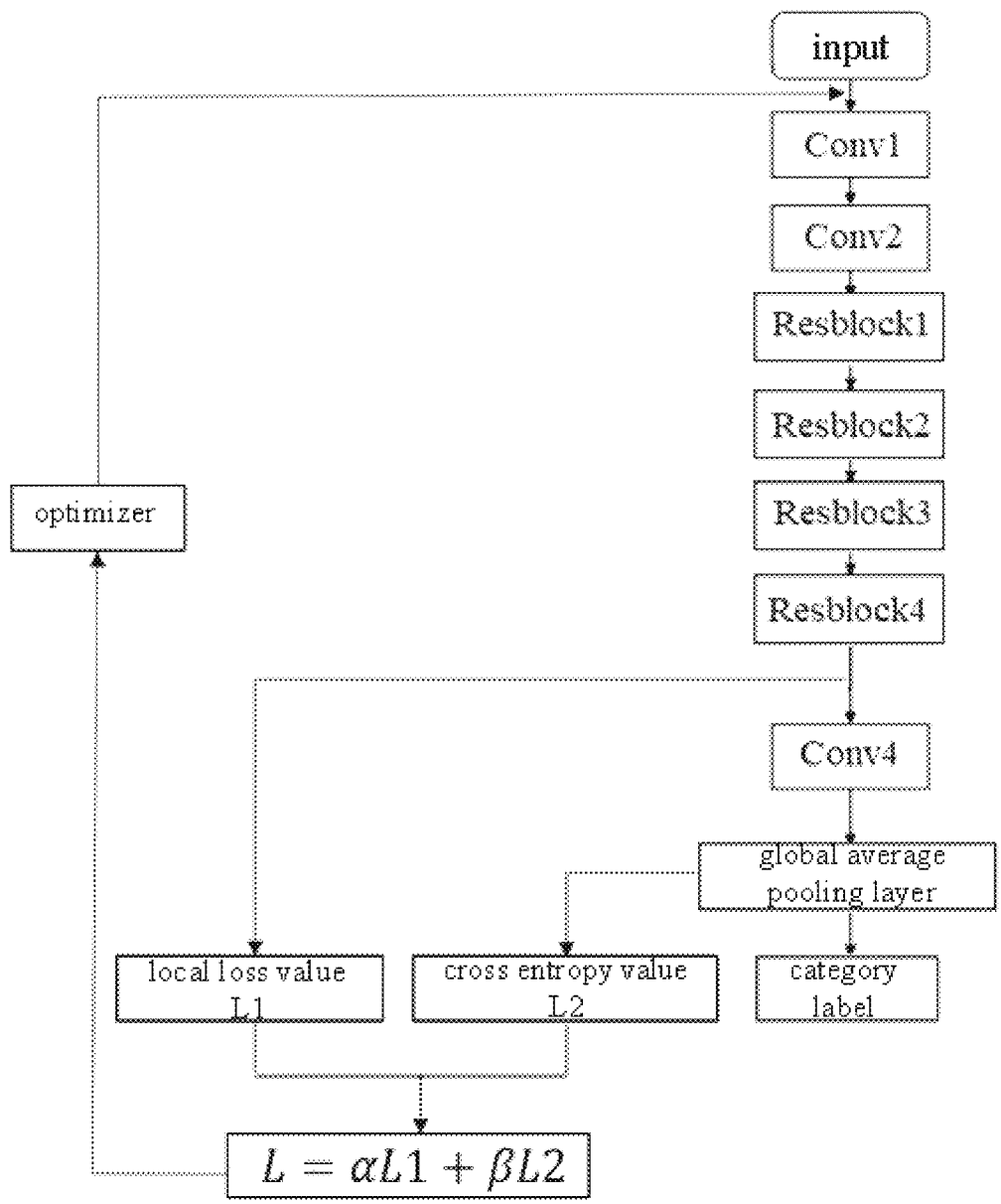
FIG. 8B shows another network structure diagram of a classification neural network according to an embodiment of the present disclosure.

FIG. 8B shows another network structure diagram of the classification neural network according to an embodiment of the present disclosure, and compared with the network structure shown in FIG. 3, FIG. 8B also comprises a training flow of the classification neural network. As shown in FIG. 8B, according to the local loss function L1 as shown in formula (9), the local loss value of the network may be calculated based on the second training feature map output by the residual network, and then the overall loss value of the network may be calculated according to the loss function shown in formula (12). The final loss value may be expressed as the weighted sum of the above two loss values, and the final loss value is expressed as:

$$L = \alpha L1 + \beta L2$$

where $\alpha \in (0,1)$ and $\beta \in (0,1)$, $\alpha$ and $\beta$ represent the weighted value, and are a set of super parameters.

Then, the optimizer trains the classification network based on the calculated loss value L, for example, adjusts the parameters in the network.

In the training method of the image classification model according to the present disclosure, a local loss function is proposed to calculate the local loss value of the network to represent the feature distance between the training sample and at least one sample of the same category, which is conducive to ensuring the accuracy of image classification.

The present disclosure also provides an image classification apparatus. Specifically, FIG. 9 shows a schematic block diagram of an image classification apparatus according to an embodiment of the present disclosure.

Figure 9:
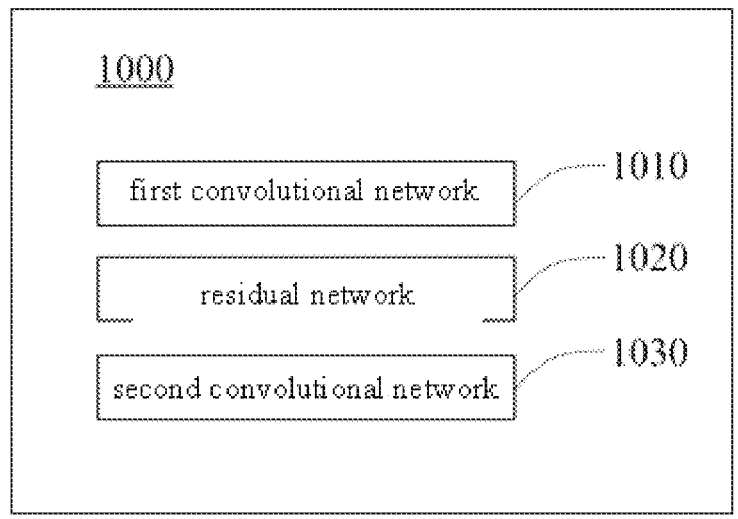
FIG. 9 shows a schematic block diagram of an image classification apparatus according to an embodiment of the present disclosure.

As shown in FIG. 9, the apparatus 1000 may include a first convolutional network unit 1010, a residual unit 1020, and a second convolutional network unit 1030.

According to some embodiments of the present disclosure, the first convolutional network unit 1010 may be configured to process an image to be processed by using the first convolutional network to obtain a first feature map. The residual network unit 1020 may be configured to process the first feature map by using the residual network to obtain a second feature map, the residual network comprises a depth separable convolutional layer. The second convolutional network unit 1030 may be configured to process the second feature map by using the second convolutional network to determine the category label of the image to be processed.

According to some embodiments of the present disclosure, the residual network comprises at least one residual module which is connected in series, and each of the at least one residual module comprises a first processing path and a second processing path, the first processing path comprises the depth separable convolutional layer, and the second processing path comprises a convolutional layer and a batch normalization layer.

According to some embodiments of the present disclosure, in a case that the residual network comprises N residual modules which are connected in series, where n is a positive integer greater than 1, processing the first feature map by using the residual network, comprises: processing the first feature map that is received, by using a first processing path and a second processing path in the first residual module of the residual network separately, to obtain a first residual feature map; processing an i−1-th residual feature map that is received, by using a first processing path and a second processing path in an i-th residual module of the residual network separately, to obtain an i-th residual feature map, where i is a positive integer greater than 1 and less than or equal to N.

According to some embodiments of the present disclosure, the first convolutional network comprises a convolutional layer, a batch normalization layer, and a nonlinear processing layer, and the second convolutional network comprises a convolutional layer and a global average pooling layer.

According to another aspect of the present disclosure, a training apparatus for an image classification model is also provided, which is configured to: obtain a training sample; process the training sample; process the training sample, by using the first convolutional network, to obtain a first training feature map; process the first training feature map, by using the residual network, to obtain a second training feature map; calculate the local loss value based on the second training feature map according to a local loss retention function; and train the first convolutional network, the residual network and a second convolutional network based on the local loss value by using an optimizer, the local loss retention function represents the feature distance between the training sample and at least one sample of the same category.

According to some embodiments of the present disclosure, the training apparatus is further configured to: process the second training feature map, by using the second convolutional network, to determine the category label of the training sample; calculate the network loss value based on the class label and a real label of the training sample according to the cross entropy loss function; and train the first convolutional network, the residual network and the second convolutional network based on the network loss value by using an optimizer. The training steps of the training apparatus of the image classification model according to an embodiment of the present disclosure can refer to the above description with reference to FIG. 8A-FIG. 8B and will not be repeated here.

Figure 10:
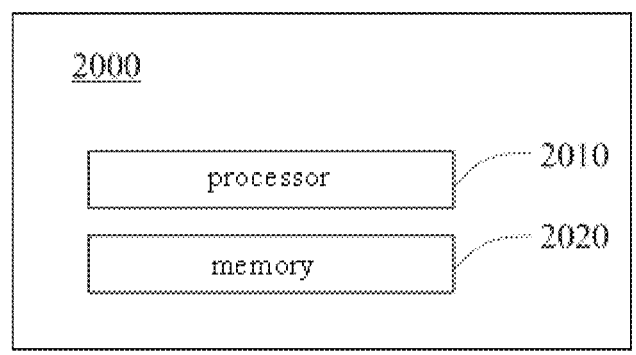
FIG. 10 shows a schematic block diagram of an image processing device according to an embodiment of the present disclosure.

According to yet another aspect of the present disclosure, an image processing device is also provided. FIG. 10 shows a schematic block diagram of an image processing device according to an embodiment of the present disclosure.

As shown in FIG. 10, the device 2000 may include a processor 2010 and a memory 2020. According to an embodiment of the present disclosure, computer-readable codes are stored in the memory 2020, and when the computer-readable codes are run by the processor 2010, the image classification method or the training method of the image classification model as described above are executed.

The processor 2010 may perform various actions and processes according to a program stored in the memory 2020. Specifically, the processor 2010 may be an integrated circuit chip with signal processing capabilities. The processor may be a general-purpose processor, a digital signal processor (DSP), an application specific integrated circuit (ASIC), a ready-made programmable gate array (FPGA) or other programmable logic devices, a discrete gate or a transistor logic device, and a discrete hardware component. Various methods, steps and logic block diagrams disclosed in the embodiment of the present disclosure may be realized or executed. The general-purpose processor may be a micro-processor, or the processor may also be any conventional processor, etc., and can be X86 architecture or ARM architecture, etc.

Memory 2020 stores computer executable instruction codes which are used to implement an image classification method according to an embodiment of the present disclosure or a training method for performing an image classification model as described above when executed by the processor 2010. The memory 2020 may be a volatile memory or a nonvolatile memory or may include both volatile memory and nonvolatile memory. Nonvolatile memory may be read-only memory (ROM), programmable read-only memory (PROM), erasable programmable read-only memory (EPROM), electrically erasable programmable read-only memory (EEPROM), or flash memory. The volatile memory may be a random access memory (RAM), which is used as an external cache. Many forms of RAMs are available, such as static random access memory (SRAM), dynamic random access memory (DRAM), synchronous dynamic random access memory (SDRAM), double data rate synchronous dynamic random access memory (DDRSDRAM), enhanced synchronous dynamic random access memory (ESDRAM), synchronously connected dynamic random access memory (SLDRAM) and direct memory bus random access memory (DR RAM). It should be noted that the memory of the method described herein is intended to include, but not be limited to, these and any other suitable types of memories.

Figure 11:
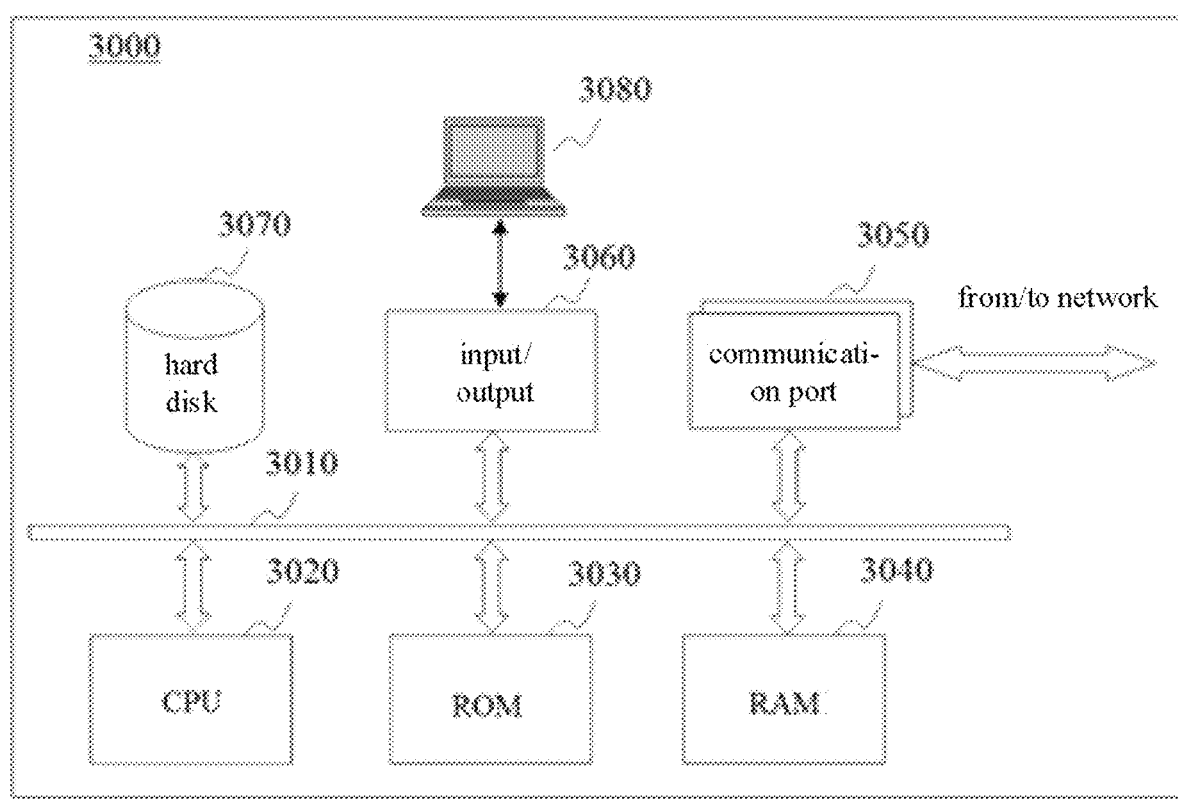
FIG. 11 shows a schematic diagram of an architecture of an exemplary computing device according to an embodiment of the present disclosure.

The method or apparatus according to an embodiment of the present disclosure may also be implemented by means of the architecture of the computing device 3000 shown in FIG. 11. As shown in FIG. 11, the computing device 3000 may include bus 3010, one or more CPUs 3020, read-only memory (ROM) 3030, random access memory (RAM) 3040, communication port 3050 connected to the network, input/output component 3060, hard disk 3070, etc. The storage device in the computing device 3000, such as ROM 3030 or hard disk 3070, may store various data or files used for processing and/or communication of the image classification method or the training method of the image classification model provided by the present disclosure, as well as program instructions executed by the CPU. The computing device 3000 may also include a user interface 3080. Of course, the architecture shown in FIG. 5 is only exemplary, when implementing different devices, one or more components of the computing device shown in FIG. 5 may be omitted according to the actual needs.

Figure 12:
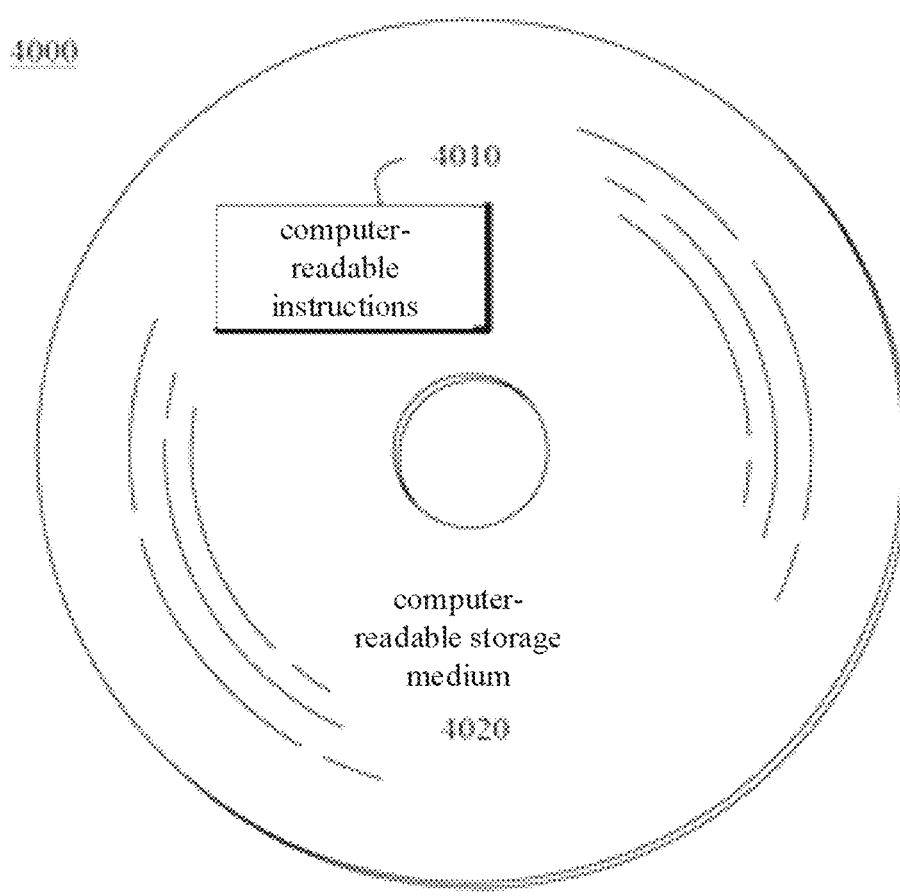
FIG. 12 shows a schematic diagram of a computer storage medium according to an embodiment of the present disclosure.

According to yet another aspect of the present disclosure, a computer-readable storage medium is also provided. FIG. 12 shows a schematic diagram 4000 of the storage medium according to the present disclosure.

As shown in FIG. 12, the computer-readable instructions 4010 are stored on the computer storage medium 4020. When the computer-readable instructions 4010 are run by the processor, the image classification method or the training method of the image classification model described with reference to the above drawings can be executed, so as to realize the recognition of the image categories by using the trained classification neural network, especially for facial expression recognition. The computer-readable storage medium comprises, but is not limited to, for example, a volatile memory and/or a non-volatile memory. The volatile memory may include, for example, random access memory (RAM) and/or cache, etc. The non-volatile memory can include, for example, a read-only memory (ROM), a hard disk, a flash memory, etc. For example, the computer storage medium 4020 can be connected to a computing device such as a computer and so on, and then, in a case that the computing device runs the computer-readable instructions 4010 stored on the computer storage medium 4020, the image classification method or the training method of the image classification model provided according to the present disclosure as described above can be performed.

Those skilled in the art can understand that the content disclosed in the present disclosure can have various modifications and improvements. For example, the various devices or components described above can be implemented by hardware, or can be implemented by software, firmware, or a combination of some or all of them.

Furthermore, although the present disclosure makes various references to certain units in the system according to the embodiments of the present disclosure, any number of different units can be used and run on the client and/or server. The unit is merely illustrative and different units can be used for different aspects of the system and method.

Those of ordinary skill in the art can understand that all or part of the steps in the above method can be completed by instructing relevant hardware through a program, and the program can be stored in a computer-readable storage medium, such as a read-only memory, a magnetic disk, or an optical disk, etc. Optionally, all or part of the steps of the foregoing embodiments can also be implemented using one or more integrated circuits. Accordingly, each module/unit in the foregoing embodiments can be implemented in the form of hardware or can be implemented in the form of software functional modules. The present disclosure is not limited to the combination of hardware and software in any particular form.

Unless defined otherwise, all terms (including technical and scientific terms) used here have the same meaning as those commonly understood by those of ordinary skill in the art to which this disclosure belongs. It should also be understood that terms such as those defined in ordinary dictionaries should be interpreted as having meanings which are consistent with their meanings in the context of the relevant technology and should not be interpreted in ideal or extremely formal meanings, unless explicitly defined as such here.

The above is an illustration of the present disclosure and should not be considered as a limitation thereof. Although several exemplary embodiments of the present disclosure are described, it will be easy for those skilled in the art to understand that many modifications can be made to the exemplary embodiments without departing from the novel teaching and advantages of the present disclosure. Therefore, all these modifications are intended to be included in the scope of the present disclosure as defined in the claims. It should be understood that the above is an illustration of the present disclosure and should not be considered as being limited to the particular embodiments disclosed, and modifications to the disclosed embodiments and other embodiments are intended to be included in the scope of the appended claims. The present disclosure is limited by the claims and their equivalents.

What is claimed is:

1. A training method for an image classification model, comprising:
   obtaining a training sample;
   processing the training sample, by using a first convolutional network, to obtain a first training feature map;
   processing the first training feature map, by using a residual network, to obtain a second training feature map;
   calculating a local loss value based on the second training feature map according to a local loss retention function; and
   training the first convolutional network, the residual network and a second convolutional network based on the local loss value by using an optimizer, wherein the local loss retention function represents a feature distance between the training sample and at least one sample of a same category.

2. The training method according to claim 1, further comprising:
   processing the second training feature map, by using the second convolutional network, to determine a category label of the training sample;
   calculating a network loss value based on the category label and a real label of the training sample according to a cross entropy loss function; and
   training the first convolutional network, the residual network and the second convolutional network based on the network loss value by using the optimizer.

3. An image processing device, comprising:
   a processor;
   a memory, wherein the memory stores computer readable codes, which, when run by the processor, execute an image classification method, comprising:
      processing an image to be processed, by using a first convolutional network, to obtain a first feature map;
      processing the first feature map, by using a residual network, to obtain a second feature map, wherein the residual network comprises a depth separable convolutional layer; and
      processing the second feature map, by using a second convolutional network, to determine a category label of the image to be processed,
      wherein, the first convolutional network, the residual network and the second convolutional network are trained thought the following steps:
         obtaining a training sample;
         processing the training sample, by using the first convolutional network, to obtain a first training feature map;
         processing the first training feature map, by using the residual network, to obtain a second training feature map;
         calculating a local loss value based on the second training feature map according to a local loss retention function; and
         training the first convolutional network, the residual network and a second convolutional network based on the local loss value by using an optimizer, wherein the local loss retention function represents a feature distance between the training sample and at least one sample of a same category.

4. The image processing device according to claim 3, wherein the residual network comprises at least one residual module that is connected in series, each of the at least one residual module comprises a first processing path and a second processing path, wherein the first processing path comprises the depth separable convolutional layer, and the second processing path comprises a convolutional layer and a batch normalization layer.

5. The image processing device according to claim 4, wherein in a case that the residual network comprises N residual modules that are connected in series and N is a positive integer greater than 1, processing the first feature map, by using the residual network, comprising:

processing the first feature map that is received, by using a first processing path and a second processing path in the first residual module of the residual network separately, to obtain a first residual feature map; and processing an i−1-th residual feature map that is received, by using a first processing path and a second processing path in an i-th residual module of the residual network separately, to obtain an i-th residual feature map, wherein i is a positive integer greater than 1 and less than or equal to N.

6. The image processing device according to claim 3, wherein the first convolutional network comprises a convolutional layer, a batch normalization layer, and a nonlinear processing layer, and the second convolutional network comprises a convolutional layer and a global average pooling layer.

7. An image classification method, comprising:

processing an image to be processed, by using a first convolutional network, to obtain a first feature map;

processing the first feature map, by using a residual network, to obtain a second feature map, wherein the residual network comprises a depth separable convolutional layer; and processing the second feature map, by using a second convolutional network, to determine a category label of the image to be processed, wherein, the first convolutional network, the residual network and the second convolutional network are trained thought the following steps:

obtaining a training sample;

processing the training sample, by using the first convolutional network, to obtain a first training feature map;

processing the first training feature map, by using the residual network, to obtain a second training feature map;

calculating a local loss value based on the second training feature map according to a local loss retention function; and training the first convolutional network, the residual network and a second convolutional network based on the local loss value by using an optimizer, wherein the local loss retention function represents a feature distance between the training sample and at least one sample of a same category.

8. The method according to claim 7, wherein the residual network comprises at least one residual module that is connected in series, each of the at least one residual module comprises a first processing path and a second processing path, wherein the first processing path comprises the depth separable convolutional layer, and the second processing path comprises a convolutional layer and a batch normalization layer.

9. The method according to claim 8, wherein in a case that the residual network comprises N residual modules that are connected in series and N is a positive integer greater than 1, processing the first feature map, by using the residual network, comprising:

processing the first feature map that is received, by using a first processing path and a second processing path in the first residual module of the residual network separately, to obtain a first residual feature map; and processing an i−1-th residual feature map that is received, by using a first processing path and a second processing path in an i-th residual module of the residual network separately, to obtain an i-th residual feature map, wherein i is a positive integer greater than 1 and less than or equal to N.

10. The method according to claim 7, wherein the first convolutional network comprises a convolutional layer, a batch normalization layer, and a nonlinear processing layer, and the second convolutional network comprises a convolutional layer and a global average pooling layer.

11. A non-transitory computer readable storage medium having instructions stored thereon, the instructions when executed by a processor, cause the processor to execute the image classification method according to claim 7.

12. The non-transitory computer readable storage medium according to claim 11, wherein the residual network comprises at least one residual module that is connected in series, each of the at least one residual module comprises a first processing path and a second processing path, wherein the first processing path comprises the depth separable convolutional layer, and the second processing path comprises a convolutional layer and a batch normalization layer.

13. The non-transitory computer readable storage medium according to claim 12, wherein in a case that the residual network comprises N residual modules that are connected in series and N is a positive integer greater than 1, processing the first feature map, by using the residual network, comprising:

processing the first feature map that is received, by using a first processing path and a second processing path in the first residual module of the residual network separately, to obtain a first residual feature map; and processing an i−1-th residual feature map that is received, by using a first processing path and a second processing path in an i-th residual module of the residual network separately, to obtain an i-th residual feature map, wherein i is a positive integer greater than 1 and less than or equal to N.

14. The non-transitory computer readable storage medium according to claim 11, wherein the first convolutional network comprises a convolutional layer, a batch normalization layer, and a nonlinear processing layer, and the second convolutional network comprises a convolutional layer and a global average pooling layer.

* * * * *